(12) United States Patent  
Baum

(10) Patent No.: US 12,555,221 B2
(45) Date of Patent: Feb. 17, 2026

(54) OPTICAL MEASUREMENT OF WORKPIECE SURFACE USING SHARPNESS MAPS

(71) Applicant: Carl Zeiss Industrielle Messtechnik GmbH, Oberkochen (DE)

(72) Inventor: Michael Baum, Ulm (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 465 days.

(21) Appl. No.: 17/736,878

(22) Filed: May 4, 2022

(65) Prior Publication Data

US 2022/0358631 A1 Nov. 10, 2022

(30) Foreign Application Priority Data

May 5, 2021 (DE) .......................... 102021111706.2

(51) Int. Cl.
*G06T 7/00* (2017.01)

(52) U.S. Cl.
CPC .... *G06T 7/001* (2013.01); *G06T 2207/20081* (2013.01); *G06T 2207/30164* (2013.01)

(58) Field of Classification Search
CPC ........... G06T 7/001; G06T 2207/20081; G06T 2207/30164; G06T 2207/20084; G06T 7/55

See application file for complete search history.

(56) References Cited

U.S. PATENT DOCUMENTS 5,151,609 A 9/1992 Nakagawa et al.

FOREIGN PATENT DOCUMENTS

| DE | 102014209342 A1 | 11/2015 | |
|---|---|---|---|
| EP | 2590139 A1 | 5/2013 | |
| JP | 2013104814 A | 5/2013 | |
| JP | 2017010327 A * | 1/2017 | ............. G01B 11/24 |
| WO | 2013116299 A1 | 8/2013 | |

OTHER PUBLICATIONS

German Patent and Trademark Office Examination Report for DE10 2021 111 706.2 dated Feb. 21, 2024.

(Continued)

*Primary Examiner* — Hwa Andrew Lee
(74) *Attorney, Agent, or Firm* — Miller Johnson

(57) ABSTRACT

A method includes capturing images of a surface of a workpiece using an optical sensor. Each image respectively images a region of the surface. Each image is assigned a defined 6-DOF pose of the optical sensor relative to the workpiece and a defined focal plane position of the optical sensor. The captured images form an image stack. The method includes determining a sharpness value for each picture element of each image of the image stack to generate a sharpness map for each image. The sharpness maps of the images form a sharpness map stack. The method includes transforming the sharpness maps of the sharpness map stack into a defined reference system based on the respective assigned 6-DOF pose and focal plane position of the optical sensor in order to generate a sharpness cloud. The method includes generating a surface profile of the workpiece based on the sharpness cloud.

33 Claims, 11 Drawing Sheets

(56) References Cited

OTHER PUBLICATIONS

Said Pertuz et al.: Analysis of focus measure operators in shape-from-focus; Article in Pattern Recognition—Nov. 2012, Research Gate.
P. Lancaster and K. Salkauskas: Surfaces generated by moving least squares methods; 1981 American Mathematical Society, vol. 37, No. 155, Jul. 1981.
German Patent and Trademark Office Examination Report for DE 10 2021 111 706.2 dated Jun. 2, 2022.
Shree K. Nayar and Yasuo Kakagawa: Shape from Focus; IEEE Transactions of Pattern Analysis and Machine Intelligence, vol. 16, No. 8, Aug. 1994.

\* cited by examiner

OPTICAL MEASUREMENT OF WORKPIECE SURFACE USING SHARPNESS MAPS

CROSS REFERENCE TO RELATED APPLICATIONS

This application claims priority to German patent application DE 102021111706.2, filed May 5, 2021, the entire disclosure of which is incorporated by reference.

FIELD

The present disclosure relates to optical metrology and more particularly to measuring a surface of a workpiece using an optical sensor.

BACKGROUND

Such a method and such equipment are known, for example, from document U.S. Pat. No. 5,151,609 A.

Measuring apparatuses for measuring the surface of a workpiece, also referred to as a measurement object, are well known from the prior art. As a matter of principle, measuring apparatuses that can measure the 3-D information of a workpiece are required in industrial metrology. In measuring apparatuses of this type, different types of sensors may be used to this end to acquire the coordinates of a workpiece to be measured.

By way of example sensors operating based on tactile measurements are known to this end. Here, the surface of the workpiece to be measured is probed with a stylus, the coordinates of said stylus in the measurement space being known at all times. Such a stylus may also be moved along the surface of a workpiece, such that a multiplicity of measurement points may be acquired at set time intervals during such a measuring process within the scope of a so-called "scanning method."

Moreover, optical measuring apparatuses that make use of optical sensors are also known. The optical sensors facilitate a contactless acquisition of the coordinates of a workpiece. In optical measuring apparatuses, the workpiece to be measured is chucked on a table as a workpiece holder. The table here forms an XY plane. The optical sensor is spaced apart from the workpiece to be measured perpendicularly from this plane, i.e. in the Z-direction of a Cartesian coordinate system.

Since conventional optical measuring apparatuses, for example microscopes or coordinate measuring machines, are only able to record 2-D data, the image depth or depth information in the Z-direction is determined by an additional technique.

By way of example, the combined use of sensors based on tactile measurements and optical sensors is known. However, tactile sensors have to be integrated in the measuring apparatus together with the optical system, increasing costs and complexity of the measuring apparatus. Moreover, the tactile sensor needs to be in contact with the workpiece, which is not always desirable.

A non-invasive and advantageous solution consists of determining the depth information in the Z-direction using optical measurements. Image blur brought about by optical defocusing changes in a predictable manner. The optical system of the optical sensor has a focal plane, which is a plane of greatest sharpness. If an object point located on the surface of the workpiece is moved toward the focal plane, then the image representation of the object point becomes sharper. If the object point is moved away from the focal plane, then the image representation of the object point becomes less sharp. If the object point is arranged in the focal plane, then the image representation of the object point is at its sharpest. Consequently, the image blur can be controlled by varying the distance between the workpiece and the optical system. A focal image stack is generated by recording images while the workpiece is moved through the focus. Depth information about the object points can be extracted based on the focal image stack using a technique which is referred to as shape from focus (SFF). Expressed differently, SFF is a method that allows 3-D information to be reconstructed based on a focal image stack of 2-D images.

Application examples of the SFF method are described in, for example, document U.S. Pat. No. 5,151,609 A and the specialist article K. Nayar, S. (1994), "Shape from focus: An effective approach for rough surfaces," IEEE Transaction, on Pattern Analysis and Machine Intelligence, 824-831.

By way of example, document U.S. Pat. No. 5,151,609 A shows that the solid shape of an object is recognized by observing the object along a Z-axis direction. A plurality of images of the object are recorded from different focal planes with corresponding different coordinate values of the Z-axis. Focus measurement values are calculated in relation to each of the pixels situated in each object image and characterized by the same X- and Y-coordinate values. The focus measurement values of the pixels in the object images having the same X- and Y-coordinate values are compared with one another in order to detect maximum focus measurement values. The solid shape of the object is then estimated based on the Z-coordinate value of the focal plane of the object image with the maximally detected focus measurement values.

Expressed differently, a sharpness map, which is also referred to as a focus map, is calculated for each image of the recorded focal image stack using a certain sharpness metric for the purposes of reconstructing the 3-D information in the SFF technique. This yields a sharpness map stack. By way of example, a corresponding sharpness metric is described in the specialist article Pertuz, S., Puig, D., & Garcia, M. A. (2013), "Analysis of focus measure operators for shape-from-focus," Pattern Recognition, 1415-1432.

A sharpness profile can be determined for each pixel of the camera sensor based on the sharpness map stack. The sharpness profile represents the sharpness value in relation to the Z-coordinate. The maximum of the sharpness profile corresponds to the depth value, that is to say the Z-coordinate, of the corresponding pixel. The maximum of the sharpness profile can be determined based on different methods. By way of example, the maximum can be determined using a least squares fitting of a Gaussian curve to the sharpness profile. Then, a depth map can be generated based on the evaluation of the sharpness maps of all pixels.

FIG. 1 shows a depth map of a surface of a workpiece as an example. FIG. 2 shows the sharpness profile of an example pixel, to which a Gaussian curve can be fitted, as an example.

In order to be able to capture a region of the surface of a workpiece, which region is larger than the region that can be captured by the camera sensor, and in order to be able to generate a depth map of said region, it is necessary to record a plurality of focal image stacks which each image different portions of the surface of the workpiece, with the portions together covering the region of the surface to be captured. To this end, the relative arrangements of camera sensor and workpiece can be changed between the individual capture processes for the focal image stacks, for example by virtue of the camera sensor and/or the workpiece being displaced in space. However, this is time consuming.

To now reduce the overall duration of the measurement of a surface region that is larger than the capture region of the camera sensor, it is possible to record a focal image stack while the measuring apparatus or only the camera sensor is moved laterally. This avoids idle times while the measuring apparatus or only the camera sensor is at a standstill. However, the resultant focal image stack is laterally displaced in that case. Expressed differently, the captured images are laterally displaced with respect to one another. Laterally displaced should be understood to mean an offset in the XY-plane. As a result, object points of the workpiece in the images of the focal image stack are imaged on different pixels of the camera sensor for different focus settings.

So that a depth map of the region of the workpiece can be generated based on this focal image stack, the image stack needs to be registered with sub pixel accuracy in order to align the corresponding pixel centers in the same way, in particular to align these flush. To this end, a grayscale value interpolation of the images can be carried out for the purposes of an alignment in relation to a defined reference system. Only a reduced region of the entire captured region can be evaluated to this end as sharpness values are required for all focus positions.

FIG. 3 shows an image stack 100 as an example. The image stack 100 contains four images 102, 104, 106, 108. Each picture element in the images has a pixel center 110. The image stack was recorded during a lateral movement of the optical sensor. The lateral movement is represented by an arrow which is labeled by reference sign 112. As a result of the lateral movement, object points of the workpiece are imaged on different pixels of the camera sensor. Only object points imaged in all recorded images can be evaluated. The pixel centers are aligned by grayscale value interpolation.

The problems set forth below arise from the previous approach for evaluating an image stack which was captured during a lateral movement of the optical sensor. Firstly, the displaced image stack must be registered to an artificial grid using a sub-pixel accurate interpolation of grayscale values. As a result, the accuracy is reduced and the calculation duration increased. Moreover, it is not possible to reliably determine a vertical edges since the sharpness profiles of pixels in the vicinity of the edge are distorted and cannot be described using a Gaussian curve.

As an example, FIG. 4 shows a distorted sharpness profile of a pixel in the vicinity of an edge, in particular at an edge, that is to say the transition between different workpiece heights.

Therefore, there still is room for improvements against this background, in particular in respect of the acquisition and processing of the data in order to be able to determine the surface profile of a surface of a workpiece as quickly and as accurately as possible.

SUMMARY

A method for measuring a surface of a workpiece using an optical sensor of a measuring apparatus is provided in a first aspect of the present invention. The method includes the following steps:

capturing a plurality of images of the surface of the workpiece using the optical sensor, each image respectively imaging a region of the surface of the workpiece, with each image being assigned a defined 6-DOF (degree of freedom) pose of the optical sensor and a defined focal plane position of the optical sensor, and with the captured images forming an image stack;

determining a sharpness value for each picture element of each image of the image stack in order to generate a sharpness map for each image of the image stack, the sharpness maps of the images forming a sharpness map stack;

transforming the sharpness maps of the sharpness map stack into a defined reference system based on the respective assigned 6-DOF pose and focal plane position of the optical sensor in order to generate a sharpness cloud; and generating a surface profile of the workpiece based on the sharpness cloud, in particular based on local sharpness maxima of the sharpness cloud.

A measuring apparatus, in particular a coordinate measuring machine or a microscope, for measuring a surface of a workpiece is provided in a second aspect of the present invention. The measuring apparatus comprises an optical sensor and a control device, the optical sensor being designed to capture images of a region of the surface of the workpiece and the control device being configured to carry out the following control steps:

capturing a plurality of images of the surface of the workpiece using the optical sensor, each image respectively imaging a region of the surface of the workpiece, with each image being assigned a defined 6-DOF pose of the optical sensor and a defined focal plane position of the optical sensor, and with the captured images forming an image stack;

determining a sharpness value for each picture element of each image of the image stack in order to generate a sharpness map for each image of the image stack, the sharpness maps of the images forming a sharpness map stack;

transforming the sharpness maps of the sharpness map stack into a defined reference system based on the respective assigned 6-DOF pose and focal plane position of the optical sensor in order to generate a sharpness cloud; and generating a surface profile of the workpiece based on the sharpness cloud, in particular based on local sharpness maxima of the sharpness cloud.

In particular, the control device of the measuring apparatus in the second aspect is configured to carry out the method steps of the method according to the first aspect or one of its configurations. In particular, the control device is designed to control the components of the measuring apparatus, in particular the optical sensor. To this end, the control device may, for example, have a closed-loop control unit which is able to transmit control commands to the components of the measuring apparatus, in particular to the optical sensor. The calculation steps for generating the surface profile of the workpiece can likewise be carried out using the control device of the measuring apparatus. To this end, the control device may comprise a data processing unit, for example, which carries out the steps for generating the surface profile.

A computer program product having a computer program is provided in a third aspect of the present invention, the computer program having program code means for carrying out a method according to the first aspect of the invention when the computer program is executed on a measuring apparatus. Furthermore, a computer program product comprising commands which, when the program is executed by a computer, prompt the latter to carry out the steps of the method according to the first aspect of the invention may also be provided.

Advantageously, the novel method is implemented using a processing unit or control device which may be a multi-purpose computer or a special computer, with an appropriate computer program or computer program product being stored and executed, the computer program or the computer program product being designed and formed to measure the surface of the workpiece according to the aforementioned method.

A workpiece should be understood to mean an object, in particular a measurement object, which is measured. The workpiece has a surface. Images of a region of the surface can be captured using an optical sensor of a measuring apparatus. The captured region of the surface of the workpiece depends on the 6-DOF pose of the optical sensor relative to the workpiece. In general, a 6-DOF pose of an object defines the position and alignment (orientation) of the object in space. Position and alignment in space together have six degrees of freedom. Consequently, the 6-DOF pose of the optical sensor relative to the workpiece should be understood to mean the position and alignment of the optical sensor relative to the workpiece. By way of example, if the workpiece and the optical sensor are moved relative to one another, then there consequently also is a change in the 6-DOF pose of the optical sensor relative to the workpiece.

In particular, the measuring apparatus can be a coordinate measuring machine. By way of example, the optical sensor may comprise an image sensor and an optical system. By way of example, the image sensor may be a charge-coupled semiconductor element sensor, which is also referred to as a CCD (charge-coupled device) sensor. The CCD sensor can be a monochrome sensor or a color sensor. Alternatively, the image sensor may be a semiconductor detector for measuring light, which is also referred to as a CMOS sensor. The optical system is capable of imaging the region of the surface of the workpiece on the image sensor. The optical system preferably comprises an at least object-side telecentric objective lens. In particular, the objective lens can be telecentric on the image side and object side.

As already explained at the outset, the optical sensor has a focal plane, which is a plane of greatest sharpness. Objects or object points located in the focal plane are imaged sharper than objects or object points not located in the focal plane. The focal plane is determined by the optical system of the optical sensor. The focal plane is arranged in space. The focal plane is spaced apart from the optical sensor. The focal plane consequently has a position in space. This position is referred to as the focal plane position. The focal plane position can be described by the distance vector from the optical sensor to the focal plane, in particular by the distance of the optical sensor from the focal plane.

An image captured by the optical sensor has a plurality of picture elements. Each picture element images an object point of the corresponding region of the surface of the workpiece with a defined focal plane position of the optical sensor. Current optical sensors may have resolutions of several megapixels. The number of picture elements of a captured image and, accordingly also the number of imaged object points, correspond to the number of pixels of the optical sensor. Consequently, the captured images may have several million picture elements.

A plurality of images are captured using the optical sensor of the measuring apparatus. The captured images form an image stack. Each image may have the same number of picture elements. Each image is assigned a defined 6-DOF pose of the optical sensor relative to the workpiece and a defined focal plane position of the optical sensor. Consequently, each image images the respective region of the workpiece in accordance with the assigned 6-DOF pose of the optical sensor relative to the workpiece and the assigned focal plane position of the optical sensor. In this case, the captured image is captured in a local reference system of the optical sensor. By way of example, the local reference system of the optical sensor may be represented by a Cartesian coordinate system. The optical sensor may be arranged at the origin of the Cartesian coordinate system. The Cartesian coordinate system has an X-coordinate, a Y-coordinate and a Z-coordinate. The focal plane extends in the X- and Y-directions and is spaced apart from the optical sensor in the Z-direction. Each object point on the surface of the workpiece has a position in the local reference system of the sensor, in particular an X-position in the X-direction, a Y-position in the Y-direction and a Z-position in the Z-direction.

The object point is imaged sharper or less sharp depending on the distance between the imaged object point and the focal plane. A sharpness value is determined for each picture element. The sharpness value may also be referred to as focus value. The sharpness value specifies a measure in relation to how sharp the respective picture element is depicted. Expressed differently, a sharpness value describes an image sharpness at a corresponding point in the focal plane. Consequently, each sharpness value specifies, in the local reference system of the optical sensor, the image sharpness at a certain point on the focal plane at the time of capture of the respective image.

By way of example, the brightness, a contrast value or a grayscale value of a picture element can be considered for the purposes of determining the sharpness value. In particular, a gradient of the brightness, of the contrast value or of the grayscale value to the surrounding picture elements can be determined for the purposes of determining the focal value. The greater the gradient, the sharper the picture element and the higher the sharpness value.

A sharpness map is generated for each image based on the determined sharpness values in each image. The sharpness map can also be referred to as a focus map. The sharpness map of an image contains an appropriate sharpness value for each picture element. Expressed differently, the sharpness map in the local reference system of the optical sensor has an appropriate sharpness value for each imaged point of the focal plane. Together the sharpness maps form a sharpness map stack. The sharpness map stack may also be referred to as focus map stack.

The sharpness maps of the sharpness map stack are transformed into a defined reference system. To this end, use is made of the respectively assigned 6-DOF pose and focal plane position of the optical sensor. The defined reference system is a common or global coordinate system. In particular, the defined reference system is a reference system in which the workpiece has a fixed arrangement, that is to say 6-DOF pose. Expressed differently, the defined reference system is a reference system that is stationary in relation to the workpiece. The defined reference system may likewise be a Cartesian coordinate system. To convert the respective local reference system into the defined, global reference system, a translation vector and/or a rotation matrix can be determined based on the respective 6-DOF pose of the sensor relative to the workpiece. Each sharpness map can be transformed into the defined, global reference system using the appropriate translation vector and/or the appropriate rotation matrix.

Together, the transformed sharpness maps form a sharpness cloud in the defined, global reference system. The sharpness cloud is a point cloud in the defined reference system, with a sharpness value being assigned to each point in the point cloud. Expressed differently, the sharpness cloud forms a three-dimensional scalar field which assigns a sharpness value to each point in the space of the defined reference system. In this case, the points of the transformed sharpness map form a section of the three-dimensional scalar field.

The surface profile of the workpiece is generated or determined based on the sharpness cloud. The sharpness cloud has local sharpness maxima at those locations where an object point of the surface of the workpiece is sharply imaged. Expressed differently, the positions of the local sharpness maxima correspond to surface points of the workpiece. Consequently, the surface profile of the workpiece can be determined based on the local sharpness maxima.

Since the surface of the workpiece is continuous, the local sharpness maxima of the sharpness cloud are simply connected and form one or more areas of maximum sharpness. Each area of maximum sharpness represents at least one part of the surface profile of the workpiece. Expressed differently, the local sharpness maxima span one or more 2-D subspaces of the 3-D space of the defined reference system, with each 2-D subspace being simply connected. The determined surface profile of the workpiece consequently supplies 3-D information about the workpiece, in particular a 3-D image representation of the workpiece in the defined reference system.

Expressed differently, the calculation of sharpness edges in the captured images and the transformation of the sharpness edges from the local reference system of the optical sensor into a defined, global reference system allows the generation of a sharpness cloud, from which the surface profile of the workpiece is determined.

The 6-DOF pose of the optical sensor, that is to say the position and the alignment of the optical sensor relative to the workpiece, is required for transformation purposes. In particular, it is possible for example to use the position of the center of the optical sensor, the pixel offset and the tilt and the rotation of the optical sensor as transformation parameters. In particular, these parameters can be determined based on the standard calibration of the optical sensor.

A registration step and grayscale matching are not required in the novel approach because the sharpness information is evaluated directly at the position in space where it was acquired by the optical sensor.

The resultant sharpness cloud can then be processed to determine the 3-D information, that is to say the surface profile, of the workpiece. The prior art has already disclosed various methods for analyzing a point cloud or a three-dimensional scalar field for the purposes of identifying a surface in this field. By way of example, algorithms known from x-ray metrology can be used to evaluate the sharpness cloud. Each of these methods can be used to determine the surface profile of the workpiece based on the sharpness cloud.

The described, novel approach for acquiring, processing and analyzing a sharpness cloud for the purposes of reconstructing the surface of a workpiece has the advantages set forth below. Firstly, it is no longer necessary to register offset image stacks, which were captured during lateral movement, with sub-pixel accuracy. Instead, the sharpness information is evaluated directly at the position in space where it was acquired by the optical sensor. Moreover, the novel approach is not based on fixed model functions. Therefore, edges can be reconstructed more reliably. Moreover, the surface reconstruction is rendered more robust and accurate because use is made not only of a sharpness profile along an axial direction but rather of the entire available 3-D sharpness information.

In a first refinement, the method may moreover include the following step: arranging the workpiece on a workpiece holder.

In particular, the measuring apparatus may comprise the workpiece holder. By arranging the workpiece on a workpiece holder, the workpiece is assigned a fixed, defined 6-DOF pose in space relative to the workpiece holder.

In a further refinement, the method may moreover include the following step: moving the optical sensor and the workpiece relative to one another during the capture step in order to change the 6-DOF pose of the optical sensor in space relative to the workpiece.

In this way, it is possible to vary the field of view of the optical sensor, in which the region of the surface of the workpiece to be captured is located, and/or the arrangement of the focal plane of the optical sensor in space relative to the workpiece.

In particular, the images can be captured in the capture step while the optical sensor and the workpiece are moved relative to one another, with each image being assigned a different, defined 6-DOF pose of the optical sensor.

In a further refinement, the optical sensor and the workpiece holder can be moved relative to one another within the movement step.

As a result, the workpiece, which is arranged on the workpiece holder, and the optical sensor are also moved relative to one another. As a result, the workpiece and the optical sensor can be moved relative to one another in a simple and defined manner. In particular, the measuring apparatus may comprise a drive device that moves the optical sensor and/or the workpiece holder. The drive device can be controlled by the control device of the measuring apparatus. By way of example, the drive device may comprise a piezoelectric drive, a direct drive or spindle drive. The drive device may be designed to move the optical sensor and/or the workpiece holder in one or more spatial directions. In particular, the measuring apparatus may comprise two drive devices, a first one to move the optical sensor and a second one to move the workpiece holder.

In a further refinement, the optical sensor can be moved in translational fashion, in particular laterally in relation to the workpiece, within the movement step.

A translational movement changes the position of the optical sensor relative to the workpiece. The translational movement may be lateral, that is to say parallel to the focal plane, and/or vertical, that is to say perpendicular to the focal plane. The lateral movement is a movement in the X- and/or Y-direction of the local reference system of the optical sensor. Consequently, different regions of the surface of the workpiece are recorded during a lateral movement, with the focal plane of the optical system remaining in the same arrangement relative to the workpiece. The vertical movement is a movement in the Z-direction of the local reference system of the optical sensor. The focal plane is displaced, in particular in the Z-direction, during a vertical movement, with the captured region of the surface of the workpiece remaining unchanged. The translational movement may be a combination of lateral and vertical movements.

In a further refinement, the optical sensor can be moved in rotational fashion, in particular tilted and/or turned, within the movement step.

A rotational movement changes the alignment, that is to say the orientation, of the optical sensor relative to the workpiece. The rotational movement may be a tilting movement and/or a turning movement. The tilting movement is a rotation about the Z-axis and/or Y-axis of the local reference system of the optical sensor. Consequently, different regions of the surface of the workpiece are recorded with different focal planes in the case of the tilting movement. The turning movement is a rotation about the Z-axis of the local reference system of the optical sensor. The rotational movement may be a combination of a tilting movement and a turning movement.

In a further refinement, the optical sensor can be moved along a predefined trajectory within the movement step.

By way of example, the predefined trajectory may be such that the optical sensor captures the entire surface, or at least the parts of the surface not covered by the workpiece holder, using the captured images. By way of example, the predefined trajectory may be a linear, closed, spiral or wavy trajectory, which leads around the workpiece or along the workpiece. The predefined trajectory may be set in accordance with the size and the arrangement of the workpiece on the workpiece holder. By way of example, the predefined trajectory may be set by a measuring program or manually.

In a further refinement, the method may moreover include the following step: changing the focal plane position of the optical sensor during the capture step.

Changing the focal plane position means that the distance of the optical sensor from its focal plane is changed. By way of example, the distance can be increased, reduced or varied sinusoidally. By way of example, the focal plane position can be varied by moving the objective lens of the optical system of the optical sensor and/or of the CCD sensor relative to one another. By changing the focal plane position, the arrangement of the focal plane of the optical sensor in space relative to the workpiece is varied. As a result, it is possible to scan regions of the surface of the workpiece in the depth direction, that is to say in the Z-direction of the local reference system of the optical sensor. By way of example, the focal plane position can be changed in accordance with a predefined setting. By way of example, the predefined setting may be set by a measuring program or manually.

In particular, the images can be captured in the capture step while the focal plane position of the optical sensor is changed, with each image being assigned a different, defined focal plane position of the optical sensor.

In a further refinement, the method may moreover include the following step: determining the 6-DOF pose and/or the focal plane position of the optical sensor while an image is being captured by the optical sensor, the determined 6-DOF pose and/or the determined focal plane position being assigned to the captured image.

By way of example, the drive device of the measuring apparatus may be pre-calibrated. If the optical sensor and the workpiece holder are moved relative to one another in accordance with a predefined trajectory, the 6-DOF pose of the optical sensor relative to the workpiece holder, and hence also relative to the workpiece, is determinable as a result of the calibration. Accordingly, the optical system of the optical sensor may also be pre-calibrated. If the focal plane position is changed in accordance with the predefined setting, the focal plane position of the optical sensor is determinable as a result of the calibration of the optical system. Alternatively, the 6-DOF pose and/or the focal plane position of the optical sensor can also be measured at the time when an image is captured.

In a further refinement, the sharpness value of each picture element can be determined based on a sharpness of the picture element.

As already mentioned at the outset, the sharpness value of a picture element can be determined, for example, based on a gradient or the local grayscale value variance in relation to the surrounding picture elements of the corresponding image.

In a further refinement, the sharpness cloud can be segmented within the generation step, in particular with the sharpness cloud being filtered based on a sharpness threshold method.

Regions of great sharpness in the sharpness cloud are identified as a result of the segmentation. Surface points of the workpiece are only located in these regions. A sharpness threshold method can be used to segment the sharpness cloud. The surface profile of the workpiece can be estimated by filtering the sharpness cloud according to sharpness thresholds. Consequently, at least approximate 3-D information in relation to the workpiece is obtained using the sharpness threshold method. Moreover, the image data amount is reduced as blurred regions are discarded.

In a further refinement, local sharpness maxima of the sharpness cloud can be determined within the generation step, with each local sharpness maximum representing a surface point of the workpiece.

As already described at the outset, the locations of the local sharpness maxima correspond to surface points of the workpiece. Consequently, the surface profile of the workpiece can be generated by determining the local sharpness maxima. In particular, the local sharpness maxima can be determined based on the segmented sharpness cloud.

In a further refinement, one or more areas of maximum sharpness can be determined within the generation step, with the areas of maximum sharpness representing the surface of the workpiece.

As already described at the outset, local sharpness maxima of the sharpness cloud form simply connected areas of maximum sharpness. The areas of maximum sharpness correspond to areas on the surface of the workpiece. The surface profile can easily be generated by determining these areas in the sharpness cloud.

In a further refinement, the moving least squares method can be applied to the sharpness cloud for the purposes of generating the surface profile, in particular with sharpness values being used as weighting factors.

This is a method for reconstructing continuous functions from a set of unorganized sample point values, in particular by calculating a measure of the weighted least squares aligned on a region around the point to be reconstructed. Expressed differently, the moving least squares method can be used to generate a 3-D surface from a point cloud either by downsampling or by upsampling. Preferably, sharpness values serve as weighting factors in this case. In particular, the moving least squares method is applied to the segmented sharpness cloud. Consequently, the moving the least squares method can be used to determine the areas of maximum sharpness in the sharpness cloud. By way of example, the use of the moving least squares method for generating surfaces is described in the specialist article Lancaster, P., & Salkauskas, K. (1981), "Surfaces generated by moving least squares methods," Mathematics of Computation, 37(155), 141-158.

In a further refinement, one or more defined geometries can be fitted to the sharpness cloud, in particular using the weighted least squares method, for the purposes of generating the surface profile.

In particular, the defined geometries are fitted to the segmented sharpness cloud. Consequently, the areas of maximum sharpness in the sharpness cloud can be determined and the surface profile of the workpiece can be reconstructed with the aid of these geometries. These are two-dimensional areas with a defined shape. The defined geometries are preferably regular or standardized geometries, for example spheres, spherical surfaces, planes, cones or conical surfaces. In particular, the defined geometries may also be more complex geometries. In particular, the defined geometries may also be image representations of a CAD model of the workpiece.

In a further refinement, a neural network trained to generate the surface profile based on the sharpness cloud can be used to generate the surface profile.

In particular, the neural network can generate the surface profile based on the segmented sharpness cloud. In particular, the neural network can be trained to determine or identify areas of maximum sharpness in the sharpness cloud. The evaluation of a sharpness cloud by a neural network is described, for example, in the specialist article Raina, P., Mudur, S. P., & Popa, T. (2019), "Sharpness fields in point clouds using deep learning," Computers & Graphics, 78, 37-53.

In a further refinement, the method may moreover include the following step: outputting the surface profile using an output device.

The measuring apparatus preferably comprises the output device. By way of example, the output device may comprise a display, with the depth map being able to be displayed on the display. Moreover, the output device may be designed to output the depth map to an electronic storage device, to a further apparatus or to an external display. By way of example, the electronic storage device may be a storage medium, in particular a hard disk drive, a flash memory or a cloud. By way of example, the further apparatus can use the depth map to carry out further processes. By way of example, the external display can be designed to display the depth map.

In a further refinement, the measuring apparatus may moreover comprise a workpiece holder for the workpiece.

To this end, the workpiece holder may comprise a support area or a holder, on or in which the workpiece can be arranged. By arranging the workpiece on a workpiece holder, the workpiece is assigned a fixed, defined 6-DOF pose in space relative to the workpiece holder.

In a further refinement, the measuring apparatus may moreover comprise a drive device for moving the optical sensor and/or the workpiece holder.

The drive device is designed to move the optical sensor and/or the workpiece holder in space, in particular relative to one another. As already explained previously, the drive device can be controlled by the control device of the measuring apparatus. By way of example, the drive device may comprise a piezoelectric drive, a direct drive or spindle drive. The drive device may be designed to move the optical sensor and/or the workpiece holder in one or more spatial directions. In particular, the measuring apparatus may comprise two drive devices, a first one to move the optical sensor and a second one to move the workpiece holder.

In a further refinement, the measuring apparatus may moreover comprise an output device for outputting the generated surface profile.

By way of example, the output device may comprise a display, with the depth map being able to be displayed on the display. Moreover, the output device may be designed to output the surface profile to an electronic storage device, to a further apparatus or to an external display. By way of example, the electronic storage device may be a storage medium, in particular a hard disk drive, a flash memory or a cloud. By way of example, the further apparatus can use the surface profile to carry out further processes. By way of example, the external display can be designed to display the surface profile.

It goes without saying that the aforementioned features and those yet to be explained below can be used not only in the combination specified in each case but also in other combinations or on their own, without departing from the scope of the present invention.

BRIEF DESCRIPTION OF THE DRAWINGS

Example embodiments of the invention are illustrated in the drawings and will be explained in greater detail in the following description.

DETAILED DESCRIPTION

Figure 1:
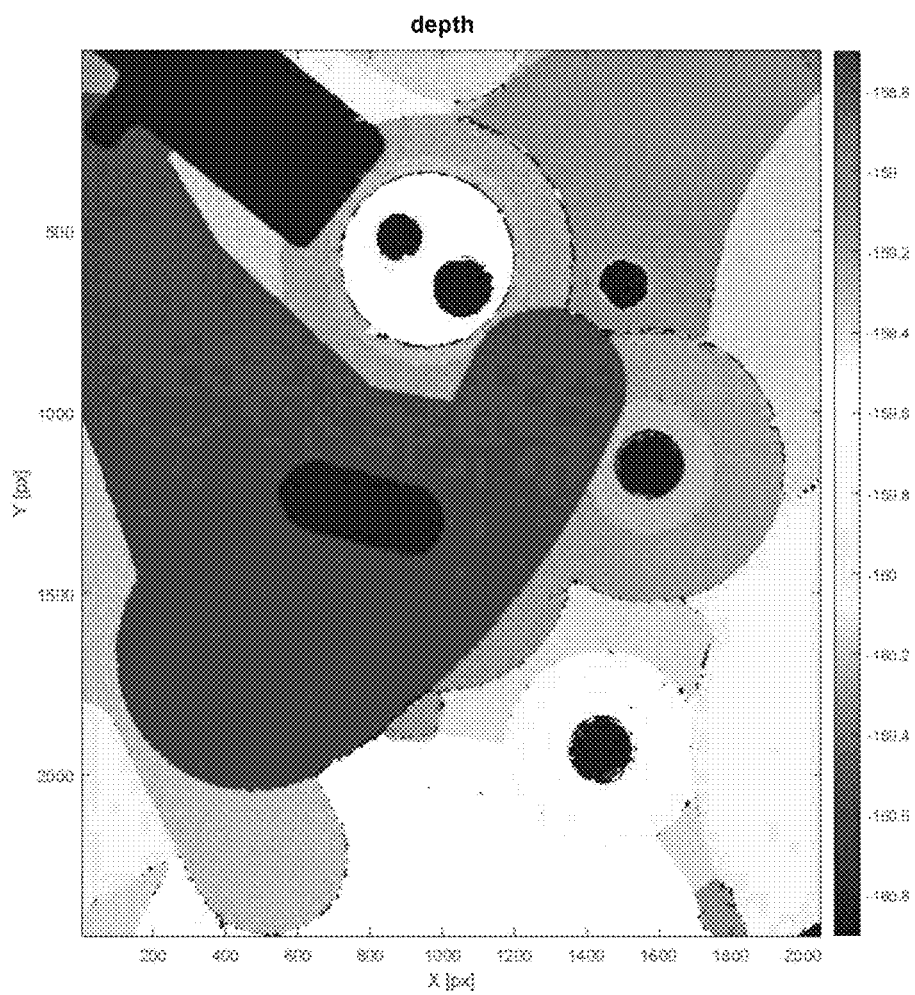
FIG. 1 shows an example representation of a depth map from the prior art.
Figure 2:
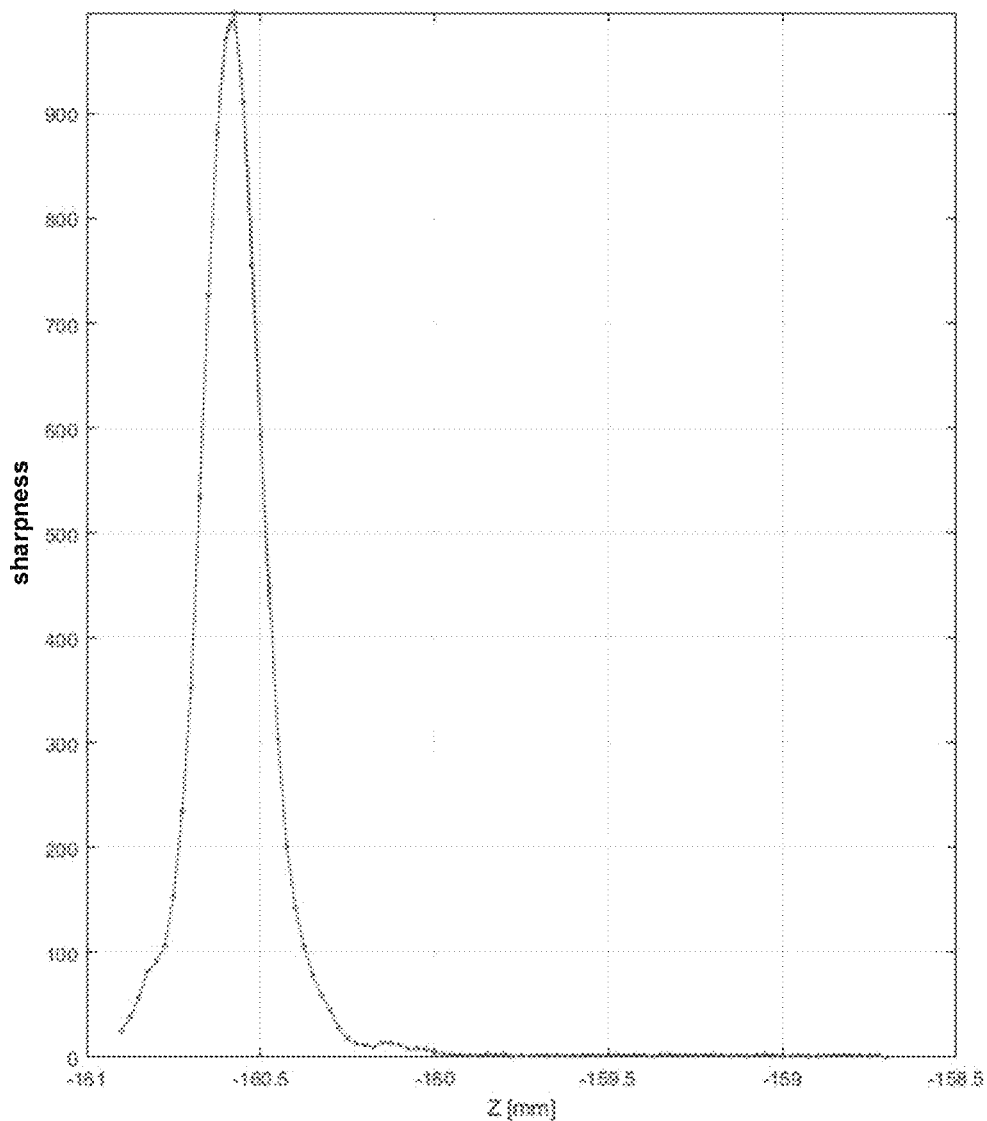
FIG. 2 shows an example representation of a sharpness profile from the prior art.
Figure 3:
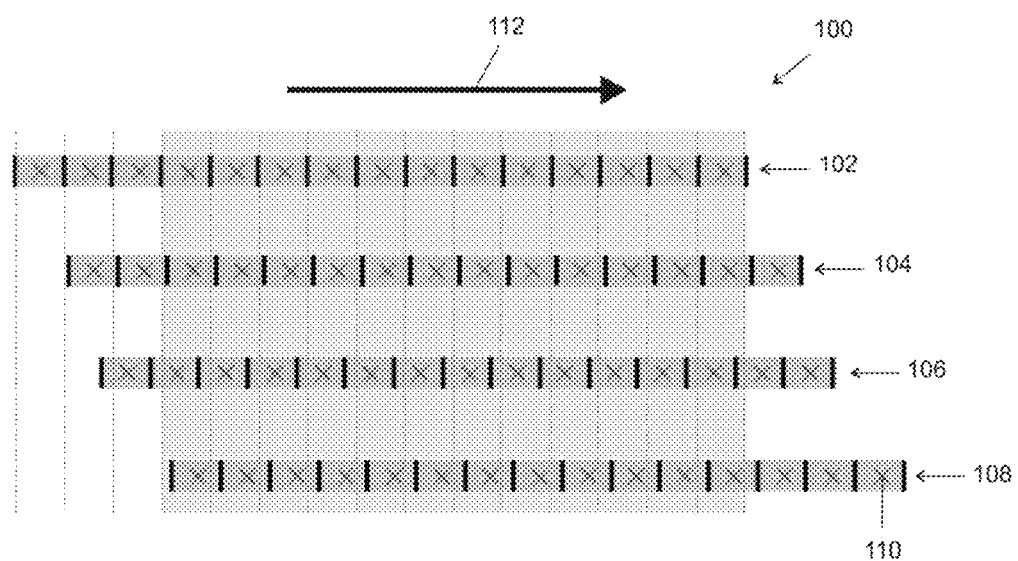
FIG. 3 shows an example representation of an offset image stack from the prior art.
Figure 4:
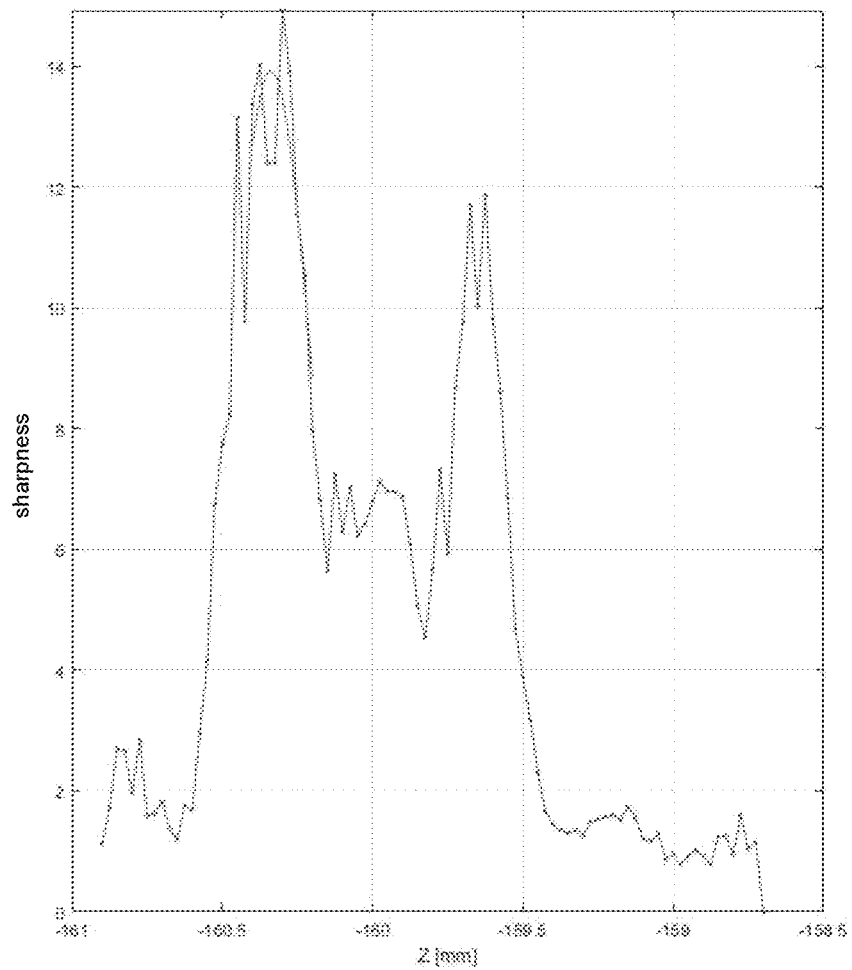
FIG. 4 shows an example representation of a distorted sharpness profile from the prior art.
Figure 5:
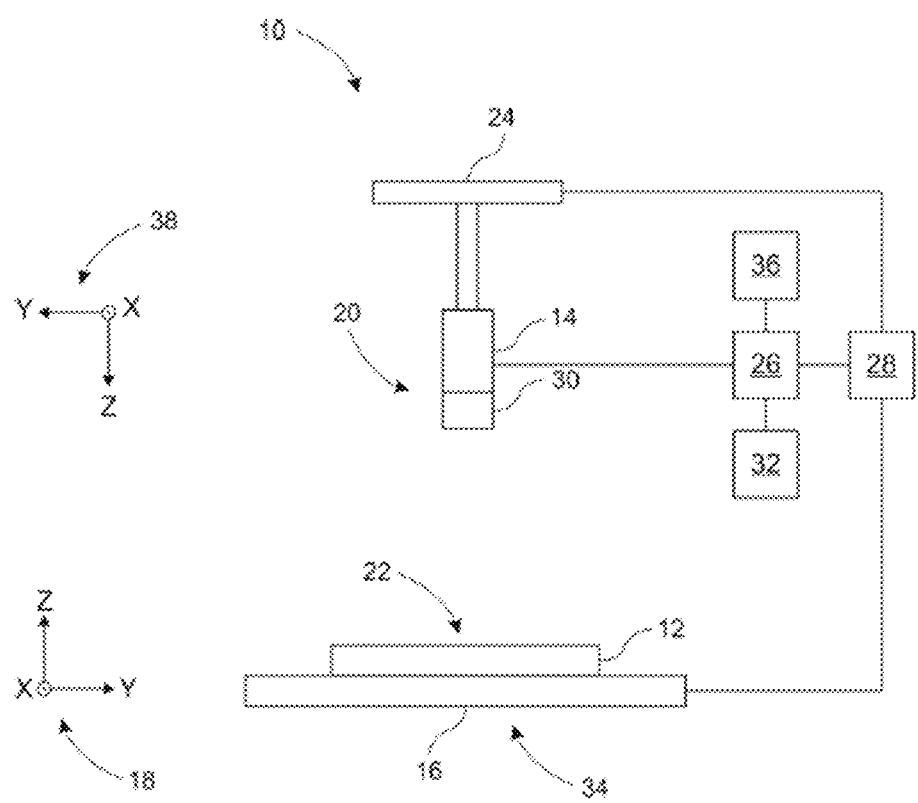
FIG. 5 shows a schematic view of a measuring apparatus.

FIG. 5 shows a measuring apparatus 10. The measuring apparatus can be a coordinate measuring machine or a microscope. The measuring apparatus 10 serves to measure a workpiece 12. For this purpose, the measuring apparatus 10 has an optical sensor 14. In addition to the optical sensor 14, further sensors can of course be provided, for example tactile sensors, which are not illustrated in the present schematic depiction, however.

The workpiece 12 to be measured is arranged on a workpiece holder 16. The workpiece holder 16 may be a measuring table, a workbench or a stage.

The optical sensor 14 may comprise an optical system 30 and an image sensor. The optical system 30 images a region of the surface of the workpiece 12 on the image sensor. The optical sensor 14 can capture an image of the region of the surface of the workpiece 12 using the image sensor. Moreover, the measuring apparatus 10 may comprise an illumination device 32. The illumination device is designed to illuminate at least the region of the surface of the workpiece 12.

The optical sensor 14 captures the region of the surface of the workpiece 12 in a local reference system 38. The local reference system 38 is a Cartesian coordinate system. The local reference system 38 is a stationary reference system in relation to the sensor. The optical sensor 14 has a fixed 6-DOF pose in the coordinate system 38. The image of the captured region of the surface of the workpiece 12 extends in the X- and Y-directions of the local reference system 38. Object points of the workpiece 12 which are located within the captured region of the surface of the workpiece 12 are spaced apart from the optical sensor in the Z-direction of the local reference system 38. The optical sensor 14 moreover has a focal plane. The focal plane extends in the X- and Y-directions of the local reference system 38 and is spaced apart from the optical sensor in the Z-direction of the local reference system 38. The arrangement of the focal plane in the local reference system 38 may be referred to as the focal plane position. The focal plane position, in particular the distance of the focal plane from the optical sensor 14, is determined by way of the arrangement of the optical system 30 and image sensor. The focal plane position is preferably changeable. By way of example, the focal plane position can be changed by a movement of an objective lens of the optical system 30 and/or of the image sensor in the Z-direction of the local reference system 38.

The workpiece 12, the optical sensor 14 and the workpiece holder 16 are arranged in space in relation to a defined reference system 18. The defined reference system 18 is a Cartesian coordinate system. In the defined reference system 18, the optical sensor 14 has a 6-DOF pose 20, the workpiece 12 has a 6-DOF pose 22 and the workpiece holder 16 has a 6-DOF pose 34. Expressed differently, the optical sensor 14, the workpiece 12 and the workpiece holder 16 each have a defined position and alignment in the defined reference system 18. The coordinate system 18 is a stationary reference system in relation to the workpiece. The workpiece holder 16 and the workpiece 12, if arranged in the workpiece holder 16, therefore have a fixed 6-DOF pose in the coordinate system 18. The 6-DOF pose 20 of the optical sensor 14 may be variable within the coordinate system 18. The 6-DOF pose 20 of the optical sensor 14 in the coordinate system 18 corresponds to a 6-DOF pose of the optical sensor 14 relative to the workpiece 12.

In the illustrated view, the workpiece holder 16 is aligned in an XY plane of the coordinate system 18. A Z-direction of the coordinate system 18 extends perpendicular to the workpiece holder 16.

The optical sensor 14 and/or the workpiece holder 16 may be designed to be movable in space. If the optical sensor 14 and/or the workpiece holder 16 are moved in space, there is a change in the 6-DOF pose of the optical sensor 14 relative to the workpiece 12. Consequently, in the process, the 6-DOF pose 20 of the optical sensor 14 changes in the coordinate system 18 that is stationary in relation to the workpiece. In principle, provision can be made for the workpiece holder 16 and/or the optical sensor 14 to be translationally and/or rotationally movable to this end, for example by a suitable mechanism 24.

Moreover, the measuring apparatus 10 may comprise a drive device 28. This drive device 28 is designed to move the workpiece holder 16 and/or the optical sensor 14 in space. By preference, the drive device 28 is designed to move the optical sensor 14 in space. To this end, the drive device 28 may comprise drive means, for example, the latter moving the mechanism 24 in order to move the optical sensor 14 as a result. Alternatively, the drive device 28 may also be designed to move the workpiece holder 16 in space. Naturally, the drive device 28 may also be designed to move both the optical sensor 14 and the workpiece holder 16 in the depth direction 20. In particular, two drive devices may be provided to this end.

The measuring apparatus 10 moreover comprises a control device 26. The control device 26 is configured to control the individual components of the measuring apparatus and to process data. By way of example, the control device 26 may comprise various subunits to this end, which each implement component control and/or data processing. By way of example, the control device 26 may comprise a closed-loop control unit which controls the drive device 28, the optical sensor 14 and/or the illumination device 32. Moreover, the control device 26 may comprise a data processing unit which is configured to implement the evaluation of images captured by the optical sensor. By way of example, the data processing unit can generate a surface profile of the workpiece 12 based on a plurality of captured images that form an image stack.

The control device 26 may be connected to or comprise a nonvolatile data memory in which a computer program is stored. In some example embodiments, the control device 26 is a multipurpose computer, for instance a commercially available personal computer running Windows®, Linux or macOS, and the computer program from the memory comprises program code designed and configured to implement embodiments of the novel method in combination with the optical sensor 14 and the drive device 28. In another example embodiment, the control device 26 is a logic circuit, for instance a field programmable gate array (FPGA), an application-specific integrated circuit (ASIC), a microcontroller or any other suitable programmable electrical circuit. Therein, the embodiments of the novel method, in particular control and determination steps, can be implemented by way of the logic circuit such that the logic circuit is designed and configured to implement embodiments of the novel method in combination with the optical sensor 14 and the drive device 28. Any suitable programming language or hardware description language can be used to implement embodiments of the novel method in the logic circuit, for instance C, VHDL, Cuda, OpenCL and the like.

Moreover, the measuring apparatus 10 may comprise an output device 36. The output device 36 is configured to output the generated surface profile of the workpiece 12. By way of example, the output device 46 may comprise a display, on which the surface profile of the workpiece 12 can be displayed. Alternatively or in addition, the output device 36 may be designed to output the surface profile of the workpiece 12 to an electronic storage device, to a further apparatus or to an external display.

Moreover, the measuring apparatus 10 may also comprise an input apparatus that allows user inputs to be effected. By way of example, the input apparatus facilitates an input of a movement trajectory of the optical sensor 14 and/or workpiece holder 16 or a manual movement of the optical sensor 14 and/or workpiece holder 16. Moreover, the focal plane position of the optical sensor 14 can also be specified or changed the input apparatus.

Alternatively or in addition, provision can also be made for the control device 26 to operate in accordance with a measuring program. By way of example, the measuring program may comprise control commands which control the movement of the optical sensor and/or workpiece holder, the setting of the focal plane position and the capture of the images. In particular, the measuring program can specify a measuring procedure for measuring the workpiece. To this end, the measuring program may for example specify a movement trajectory, along which the optical sensor 14 and/or the workpiece holder 16 should be moved. Moreover, the measuring program may specify how the focal plane position should be changed. Moreover, the measuring program can define the times at which images should be captured using the optical sensor 14. The control device 26 can control the optical sensor 14 and the drive device 28 in accordance with the control commands.

By way of example, the measuring program may be stored in the data memory that is connected to the control device 26 or comprised by the control device 26. The measuring program may also run on an external apparatus, for example a computer, with appropriate control commands of the measuring program being transmitted to the control device 26.

A plurality of images, the images forming an image stack, are captured using the optical sensor for the purposes of measuring the workpiece 12. At the time an image is captured, the optical sensor 14 has a corresponding 6-DOF pose relative to the workpiece 12 and a corresponding focal plane position. Therefore, each captured image is assigned a defined 6-DOF pose of the optical sensor 14 relative to the workpiece 12 and a defined focal plane position of the optical sensor 14. The 6-DOF pose of the optical sensor 14 relative to the workpiece 12 and the focal plane position of the optical sensor 14 may be varied while the plurality of images are captured, and so different 6-DOF poses and/or different focal plane positions are assigned to the images. By way of example, the optical sensor may be moved laterally relative to the workpiece and/or the focal plane position may be varied while the images are captured. Then, the image stack may be evaluated by the control device 26 in order to generate the surface profile of the surface of the workpiece 12.

Figure 6:
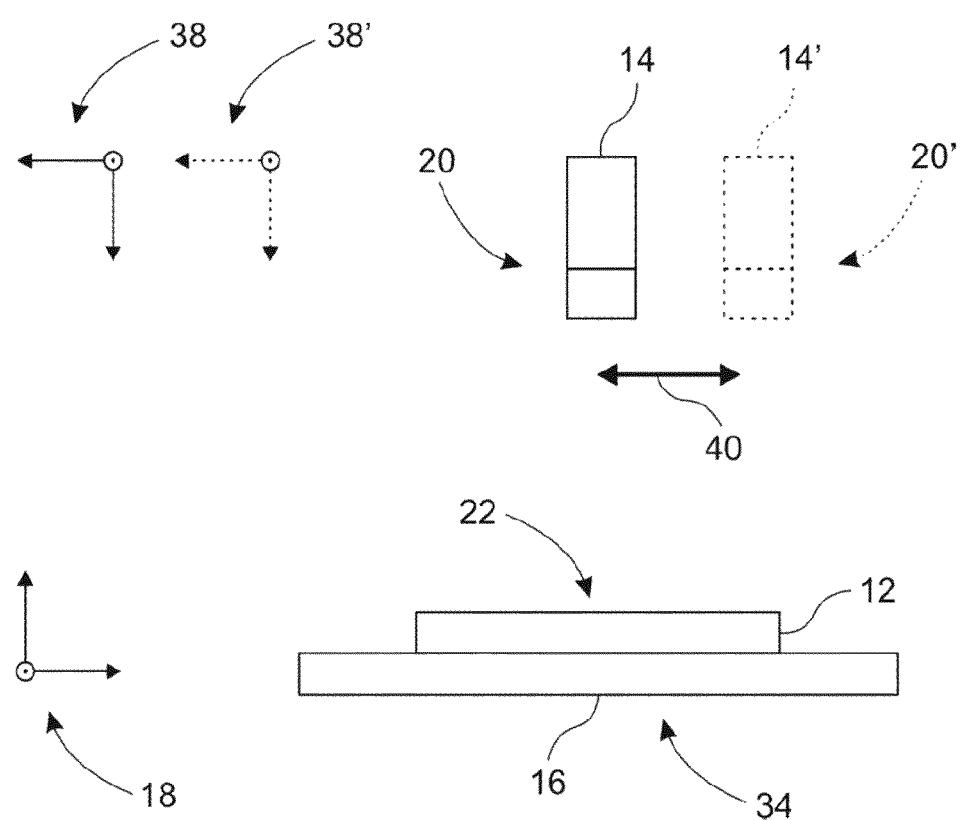
FIG. 6 shows a schematic view for representing a translational movement of an optical sensor of the measuring apparatus from FIG. 5.
Figure 7:
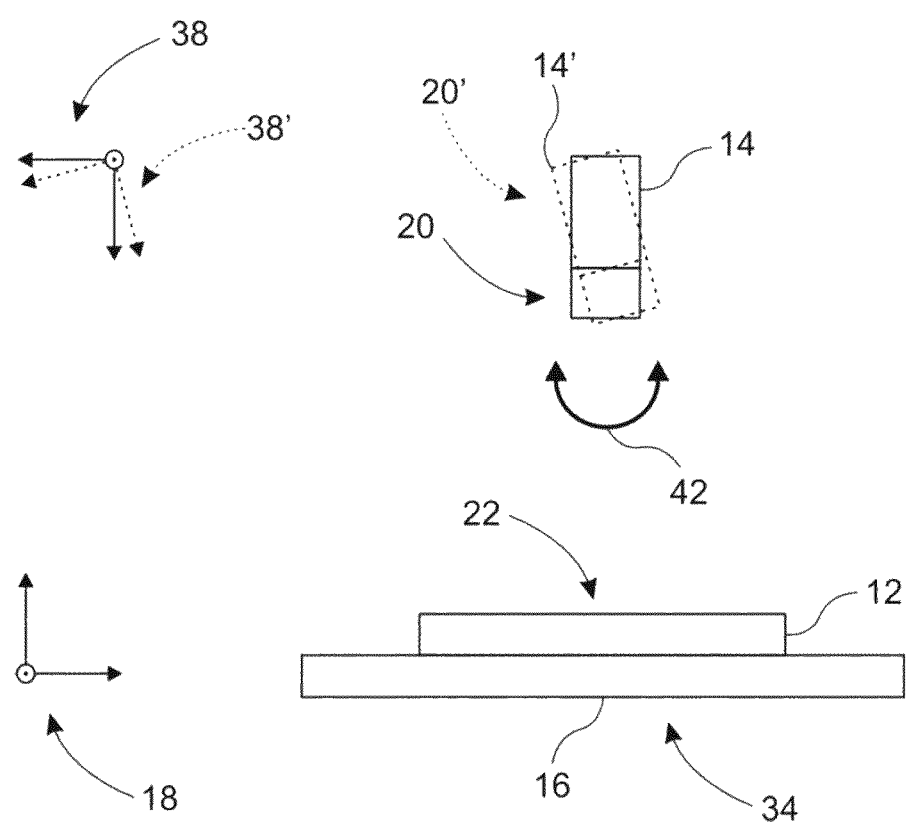
FIG. 7 shows a schematic view for representing a rotational movement of the optical sensor of the measuring apparatus from FIG. 5.

FIGS. 6 and 7 show example changes in the 6-DOF pose of the optical sensor 14 relative to the workpiece 12. In particular, the 6-DOF pose of the optical sensor 14 may be implemented relative to the workpiece 12 while the images are captured. In the process, the 6-DOF pose may be changed incrementally or continuously.

The optical sensor 14 is moved in translational fashion in FIG. 6. The translational movement is represented by an arrow with the reference sign 40. In the process, the optical sensor 14 is moved from a 6-DOF pose 20 to a 6-DOF pose 20'. In the process, the local reference system 38 is likewise displaced in translational fashion in relation to the reference system 18. The displaced arrangement of the reference system 38 is represented by 38'. In principle, there are no restrictions on the movement direction of the movement 40 in space. The movement direction in which the optical sensor is moved in FIG. 6 is lateral to the workpiece 12. Alternatively, the movement direction can also be perpendicular or oblique to the workpiece 12. Oblique means that the movement direction has both a lateral and a perpendicular direction component.

Alternatively, the workpiece holder 16 may also be moved in translational fashion in order to change the 6-DOF pose of the optical sensor 14 relative to the workpiece 12.

The optical sensor 14 is moved in rotational fashion in FIG. 7. The rotational movement is represented by an arrow with the reference sign 42. In the process, the optical sensor 14 is pivoted from a 6-DOF pose 20 to a 6-DOF pose 20'. In the process, the local reference system 38 is likewise turned in relation to the reference system 18. The turned arrangement of the reference system 38 is represented by 38'. In principle, there are no restrictions on the turning direction of the turning movement 42 in space. In FIG. 6, the optical sensor 14 is pivoted in relation to the workpiece 12 in order to be able to capture different regions of the workpiece as a result. Preferably, the turning direction is a turn around the origin of the local reference system 38. In FIG. 6, the turning direction in which the optical sensor is turned about the X-axis of the local reference system 38. In particular, the optical sensor is turned about the X-axis of the local reference system. Alternatively, turning may also be implemented about the Y-axis, the Z-axis or in any other desired direction about the origin of the local reference system 38.

Alternatively, the workpiece holder 16 may also be moved in rotational fashion in order to change the 6-DOF pose of the optical sensor 14 relative to the workpiece 12.

Figure 8:
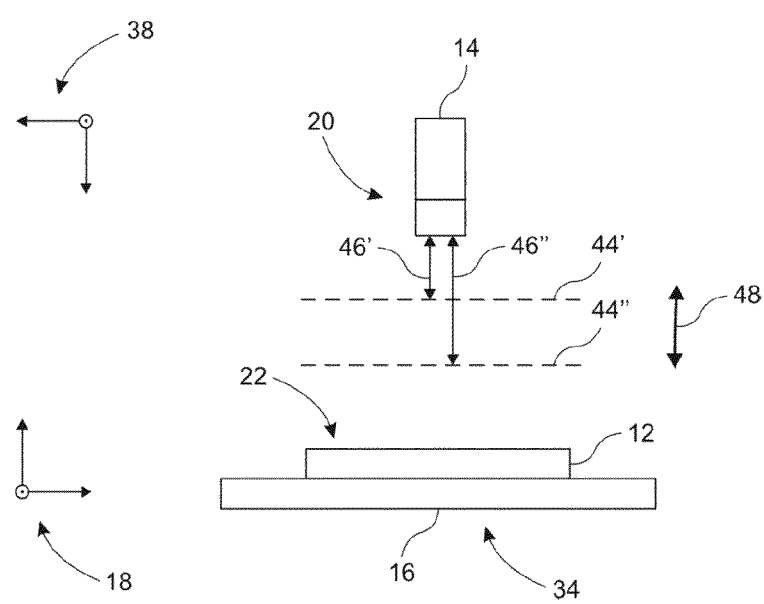
FIG. 8 shows a schematic view for representing different focal plane positions of the optical sensor of the measuring apparatus from FIG. 5.

FIG. 8 shows a change in the focal plane position of the optical sensor 14 as an example. In principle, the optical sensor has a focal plane 44 which is spaced apart from the optical sensor by a distance 46. FIG. 7 depicts two different focal plane positions 44', 44'' at different distances 46', 46''. A change in the focal plane position leads to the focal plane being displaced in the direction 48. The direction 48 corresponds to the Z-direction of the local reference system 38.

In particular, the focal plane position, that is to say the distance 46 from the focal plane 44 while the images are captured, can be changed, for example increased or reduced. The focal plane position can be changed incrementally or continuously.

Figure 9:
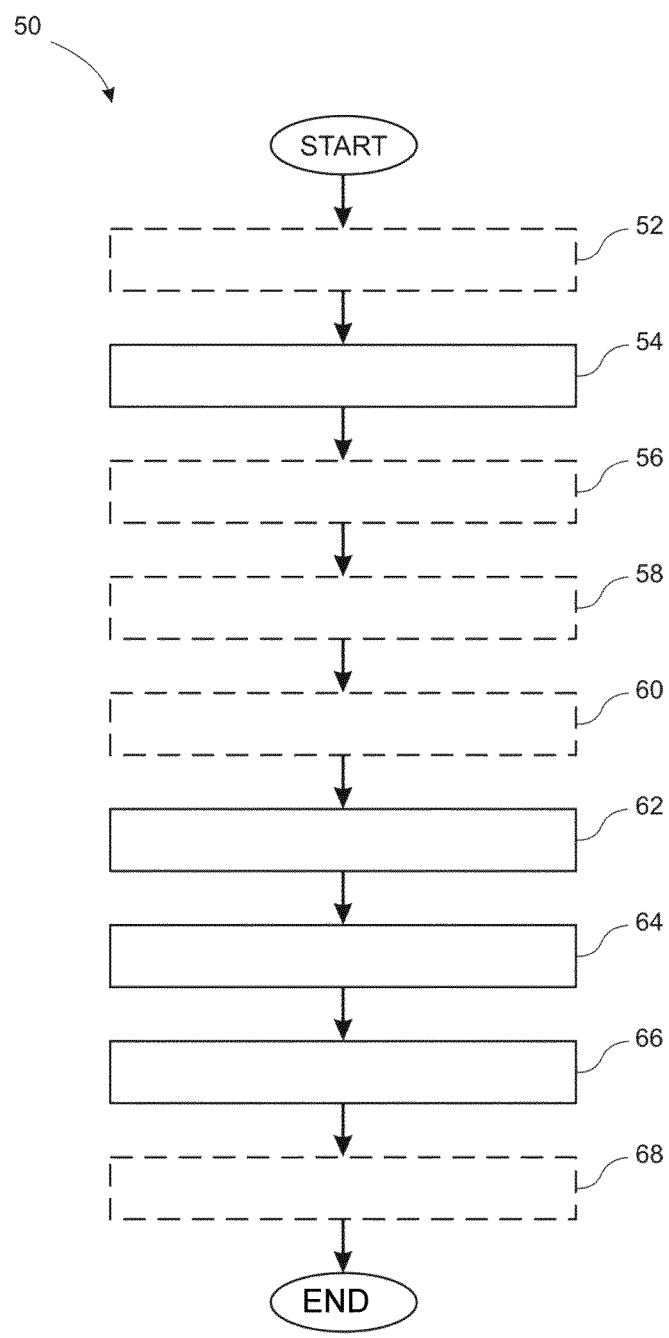
FIG. 9 shows a schematic view of a method for measuring a surface of a workpiece.

FIG. 9 shows a method 50 for measuring a surface of the workpiece 12 with the optical sensor 14 of the measuring apparatus 10. Optional steps of the method are depicted using dashed lines in FIG. 9. In particular, the method can be carried out using the control device 26. The workpiece 12 may be arranged on the workpiece holder 16 for measurement purposes. With a defined focal plane position, the optical sensor 14 can capture a region of the surface of the workpiece 12 from a defined 6-DOF pose relative to the workpiece 12.

The workpiece 12 is arranged on the workpiece holder 16 in a first, optional step 52 of the method 50.

In a further step 54 of the method 50, a plurality of images of the surface of the workpiece 12 are captured using the optical sensor 14, each image respectively imaging a region of the surface of the workpiece 12, with each image being assigned a defined 6-DOF pose of the optical sensor 14 relative to the workpiece 12 and a defined focal plane position of the optical sensor 12, and with the captured images forming an image stack.

In a further optional step 56 of the method 50, the optical sensor 14 and the workpiece 12 are moved relative to one another during the capture step 54 in order to change the 6-DOF pose of the optical sensor 14 in space relative to the workpiece 12. In particular, the images are captured in the capture step 54 while the optical sensor 14 and the workpiece 12 are moved relative to one another, with each image being assigned a different, defined 6-DOF pose of the optical sensor 14 relative to the workpiece 12.

The optical sensor 14 and the workpiece holder 16 can be moved relative to one another within the movement step 56. For example, the optical sensor 14 and/or the workpiece holder 16 can be moved by the drive device 28.

In particular, the optical sensor 14 can be moved in translational and/or rotational fashion. With regard to the translational movement 40, the optical sensor 14 can be moved laterally or perpendicularly in relation to the workpiece. With regard to the rotational movement 42, the optical sensor 14 can be tilted and/or turned. Alternatively or in addition, the workpiece holder 16 can also be moved in translational and/or rotational fashion.

In particular, the optical sensor 14 can be moved along a predefined trajectory.

In a further optional step 58 of the method 50, the focal plane position of the optical sensor 14 is changed during the capture step 54. In the process, the distance 46 of the optical sensor 14 from its focal plane 44 is changed.

In particular, the images are captured in the capture step 54 while the focal plane position of the optical sensor 14 is changed, with each image being assigned a different, defined focal plane position of the optical sensor 14.

In a further, optional step 60 of the method 50, the 6-DOF pose and/or the focal plane position of the optical sensor 14 is determined while an image is being captured by the optical sensor 14, the determined 6-DOF pose and/or the determined focal plane position being assigned to the captured image.

In a further step 62 of the method 50, a sharpness value is determined for each picture element of each image of the image stack in order to generate a sharpness map for each image of the image stack, the sharpness maps of the images forming a sharpness map stack. In particular, the sharpness value of each picture element is determined based on a sharpness of the picture element.

In a further step 64 of the method 50, the sharpness maps of the sharpness map stack are transformed into a defined reference system 18 based on the respective assigned 6-DOF pose and focal plane position of the optical sensor 14 in order to generate a sharpness cloud.

In a further step 66 of the method 50, a surface profile of the workpiece is generated based on the sharpness cloud, in particular based on local sharpness maxima of the sharpness cloud.

The sharpness cloud can be segmented within the generation step 66, in particular with the sharpness cloud being filtered based on a sharpness threshold method.

Local sharpness maxima of the sharpness cloud, in particular one or more areas of maximum sharpness, can be determined within the generation step 66, with each local sharpness maximum representing a surface point of the workpiece, in particular with the areas of maximum sharpness representing the surface of the workpiece. By way of example, the sharpness threshold method can be used to determine the local sharpness maxima. Alternatively, the local sharpness maxima, in particular the areas of maximum sharpness, can be determined based on the segmented sharpness cloud.

In the generation step 66, the moving least squares method can be applied to the segmented sharpness cloud for the purposes of generating the surface profile, in particular with sharpness values being used as weighting factors.

In the generation step 66, defined geometries can be fitted to the sharpness cloud, in particular by a weighted least squares method, for the purposes of generating the surface profile.

In the generation step 66, a neural network trained to generate the surface profile based on the sharpness cloud can also be used to generate the surface profile.

The surface profile is output by the output device 36 in a further, optional step 68 of the method 50.

Figure 10:
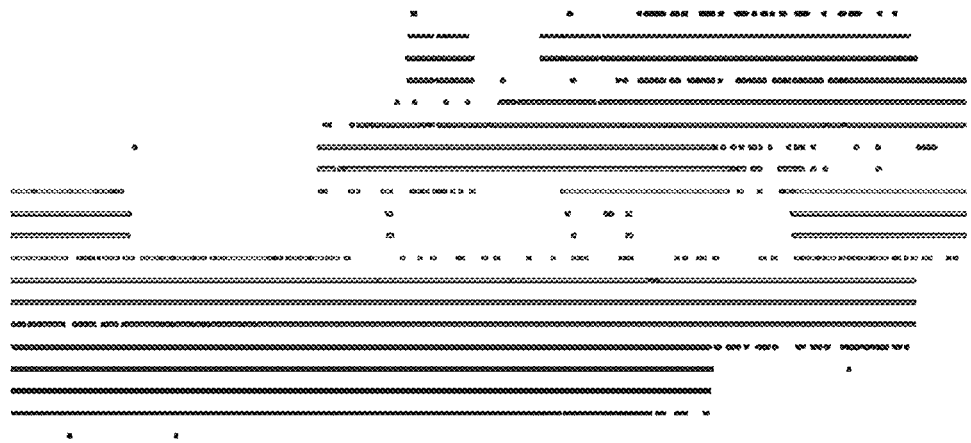
FIG. 10 shows an example side view of a sharpness cloud.

As an example, FIG. 10 shows a side view of a sharpness cloud, the sharpness cloud being based on images recorded from different focal plane positions while the optical sensor 14 was moved laterally in relation to the workpiece 12. The side view consequently shows individual sections in the Z-direction of the reference system 18, each section being assigned to an image.

Figure 11:
FIG. 11 shows an example view of a segmented sharpness cloud.

As an example, FIG. 11 shows a view of a segmented sharpness cloud, the sharpness cloud having been filtered by the sharpness threshold method. The segmented sharpness cloud provides a rough estimate of the surface profile of the workpiece 12 to be measured.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc). The phrase at least one of A, B, and C should be construed to mean a logical (A OR B OR C), using a non-exclusive logical OR, and should not be construed to mean "at least one of A, at least one of B, and at least one of C."

The invention claimed is:

1. A method for measuring a surface of a workpiece using an optical sensor of a measuring apparatus, the method comprising:
   capturing a plurality of images of the surface of the workpiece using the optical sensor, wherein each image respectively images a region of the surface of the workpiece, wherein each image is assigned a defined 6-DOF pose of the optical sensor relative to the workpiece and a defined focal plane position of the optical sensor, and wherein the captured images form an image stack;
   determining a sharpness value for each picture element of each image of the image stack in order to generate a sharpness map for each image of the image stack, wherein each sharpness map includes the determined sharpness value of each picture element of the respective image, and wherein the sharpness maps of the images form a sharpness map stack;
   transforming the sharpness maps of the sharpness map stack into a defined reference system based on the respective assigned 6-DOF pose and focal plane position of the optical sensor in order to generate a sharpness cloud, wherein the sharpness cloud includes the determined sharpness value of each picture element of each image of the plurality of images, wherein the sharpness cloud forms a three-dimensional scalar field that assigns each determined sharpness value to a respective point in a space of the defined reference system; and
   generating a surface profile of the workpiece based on local sharpness maxima of the sharpness cloud,
   wherein the generating includes determining local sharpness maxima of the sharpness cloud by analyzing the sharpness cloud, and
   wherein each local sharpness maximum of the local sharpness maxima represents a surface point of the workpiece.

2. The method of claim 1 further comprising arranging the workpiece on a workpiece holder.

3. The method of claim 1 further comprising moving the optical sensor and the workpiece relative to one another during the capturing in order to change the 6-DOF pose of the optical sensor in space relative to the workpiece.

4. The method of claim 3 wherein a drive device of the measuring apparatus is used to move at least one of the optical sensor and a workpiece holder.

5. The method of claim 3 wherein the moving includes moving the optical sensor in translational fashion, laterally in relation to the workpiece.

6. The method of claim 3 wherein:
the moving includes moving the optical sensor in rotational fashion; and
the rotational fashion includes at least one of tilting and turning.

7. The method of claim 3 wherein the moving includes moving the optical sensor along a predefined trajectory.

8. The method of claim 3 wherein:
the capturing is performed while the optical sensor and the workpiece are moved relative to one another; and
each image is assigned a different, defined 6-DOF pose of the optical sensor.

9. The method of claim 1 further comprising:
changing the focal plane position of the optical sensor during the capturing,
wherein the capturing is performed while the focal plane position of the optical sensor is changed, and
wherein each image is assigned a different, defined focal plane position of the optical sensor.

10. The method of claim 1 further comprising:
determining the 6-DOF pose and/or the focal plane position of the optical sensor while an image is being captured by the optical sensor,
wherein the determined 6-DOF pose and/or the determined focal plane position are assigned to the captured image.

11. The method of claim 1 wherein the sharpness value of each picture element is determined based on a sharpness of the picture element.

12. The method of claim 1 wherein:
the generating includes segmenting the sharpness cloud, with the sharpness cloud being filtered based on a sharpness threshold method, and
the local sharpness maxima are determined based on the segmented sharpness cloud.

13. The method of claim 1 wherein:
the generating includes determining one or more areas of maximum sharpness of the sharpness cloud; and
the areas of maximum sharpness represent the surface of the workpiece.

14. The method of claim 1 further comprising applying a moving least squares method to the sharpness cloud to generate the surface profile.

15. The method of claim 14 wherein sharpness values are used as weighting factors.

16. The method of claim 1 wherein defined geometries are fitted to the sharpness cloud to generate the surface profile.

17. The method of claim 16 wherein the geometries are fitted using a weighted least squares method.

18. The method of claim 1 wherein a neural network trained to generate the surface profile based on the sharpness cloud is used to generate the surface profile.

19. The method of claim 1 further comprising outputting the surface profile by an output device.

20. The method of claim 12 further comprising applying a moving least squares method to the segmented sharpness cloud to generate the surface profile.

21. The method of claim 20 wherein sharpness values are used as weighting factors.

22. The method of claim 12 wherein defined geometries are fitted to the segmented sharpness cloud to generate the surface profile.

23. The method of claim 22 wherein the geometries are fitted using a weighted least squares method.

24. The method of claim 12 wherein a neural network trained to generate the surface profile based on the segmented sharpness cloud is used to generate the surface profile.

25. A measuring apparatus for measuring a surface of a workpiece, the measuring apparatus comprising:
an optical sensor configured to image the surface of the workpiece; and
a control device configured to:
capture a plurality of images of the surface of the workpiece using the optical sensor, wherein each image respectively images a region of the surface of the workpiece, wherein each image is assigned a defined 6-DOF pose of the optical sensor and a defined focal plane position of the optical sensor, and wherein the captured images form an image stack;
determine a sharpness value for each picture element of each image of the image stack in order to generate a sharpness map for each image of the image stack, wherein each sharpness map includes the determined sharpness value of each picture element of the respective image, and wherein the sharpness maps of the images form a sharpness map stack;
transform the sharpness maps of the sharpness map stack into a defined reference system based on the respective assigned 6-DOF pose and focal plane position of the optical sensor to generate a sharpness cloud, wherein the sharpness cloud includes the determined sharpness value of each picture element of each image of the plurality of images, wherein the sharpness cloud forms a three-dimensional scalar field that assigns each determined sharpness value to a respective point in a space of the defined reference system; and
generate a surface profile of the workpiece based on local sharpness maxima of the sharpness cloud by analyzing the sharpness cloud,
wherein the generating includes determining local sharpness maxima of the sharpness cloud, and
wherein each local sharpness maximum of the local sharpness maxima represents a surface point of the workpiece.

26. The measuring apparatus of claim 25 further comprising a workpiece holder configured to hold the workpiece.

27. The measuring apparatus of claim 26 further comprising a drive device configured to move at least one of the optical sensor and the workpiece holder.

28. The measuring apparatus of claim 25 further comprising an output device configured to output the generated surface profile.

29. The measuring apparatus of claim 25 wherein the measuring apparatus is at least one of a coordinate measuring machine and a microscope.

30. A non-transitory computer-readable medium comprising instructions including:
capturing a plurality of images of a surface of a workpiece using an optical sensor, wherein each image respectively images a region of the surface of the workpiece, wherein each image is assigned a defined 6-DOF pose of the optical sensor relative to the workpiece and a defined focal plane position of the optical sensor, and wherein the captured images form an image stack;

determining a sharpness value for each picture element of each image of the image stack in order to generate a sharpness map for each image of the image stack, wherein each sharpness map includes the determined sharpness value of each picture element of the respective image, and wherein the sharpness maps of the images form a sharpness map stack;

transforming the sharpness maps of the sharpness map stack into a defined reference system based on the respective assigned 6-DOF pose and focal plane position of the optical sensor to generate a sharpness cloud, wherein the sharpness cloud includes the determined sharpness value of each picture element of each image of the plurality of images, wherein the sharpness cloud forms a three-dimensional scalar field that assigns each determined sharpness value to a respective point in a space of the defined reference system; and generating a surface profile of the workpiece based on local sharpness maxima of the sharpness cloud, wherein the generating includes determining local sharpness maxima of the sharpness cloud by analyzing the sharpness cloud, and wherein each local sharpness maximum of the local sharpness maxima represents a surface point of the workpiece.

31. A method for measuring a surface of a workpiece using an optical sensor of a measuring apparatus, the method comprising:

capturing a plurality of images of the surface of the workpiece using the optical sensor, wherein each image respectively images a region of the surface of the workpiece, wherein each image is assigned a defined 6-DOF pose of the optical sensor relative to the workpiece and a defined focal plane position of the optical sensor, and where in the captured images form an image stack;

determining a sharpness value for each picture element of each image of the image stack in order to generate a sharpness map for each image of the image stack, wherein each sharpness map includes the determined sharpness value of each picture element of the respective image, and wherein the sharpness maps of the images form a sharpness map stack;

transforming the sharpness maps of the sharpness map stack into a defined reference system based on the respective assigned 6-DOF pose and focal plane position of the optical sensor in order to generate a sharpness cloud, wherein the sharpness cloud includes the determined sharpness value of each picture element of each image of the plurality of images, wherein the sharpness cloud forms a three-dimensional scalar field that assigns each determined sharpness value to a respective point in a space of the defined reference system; and generating a surface profile of the workpiece by determining one or more areas of maximum sharpness of the sharpness cloud, wherein the areas of maximum sharpness represent the surface of the workpiece, wherein the areas of maximum sharpness in the sharpness cloud are determined by applying a moving least squares method to the sharpness cloud, and wherein the moving least squares method is used to generate a three-dimensional surface from the sharpness cloud.

32. A method for measuring a surface of a workpiece using an optical sensor of a measuring apparatus, the method comprising:

capturing a plurality of images of the surface of the workpiece using the optical sensor, wherein each image respectively images a region of the surface of the workpiece, wherein each image is assigned a defined 6-DOF pose of the optical sensor relative to the workpiece and a defined focal plane position of the optical sensor, and wherein the captured images form an image stack;

determining a sharpness value for each picture element of each image of the image stack in order to generate a sharpness map for each image of the image stack, wherein each sharpness map includes the determined sharpness value of each picture element of the respective image, and wherein the sharpness maps of the images form a sharpness map stack;

transforming the sharpness maps of the sharpness map stack into a defined reference system based on the respective assigned 6-DOF pose and focal plane position of the optical sensor in order to generate a sharpness cloud, wherein the sharpness cloud includes the determined sharpness value of each picture element of each image of the plurality of images, wherein the sharpness cloud forms a three-dimensional scalar field that assigns each determined sharpness value to a respective point in a space of the defined reference system; and generating a surface profile of the workpiece by determining one or more areas of maximum sharpness of the sharpness cloud, wherein the areas of maximum sharpness represent the surface of the workpiece, wherein the areas of maximum sharpness in the sharpness cloud are determined by fitting defined geometries to the sharpness cloud, and wherein the defined geometries comprise at least one of spheres, spherical surfaces, planes, cones, conical surfaces and a representations of a CAD model of the workpiece.

33. A method for measuring a surface of a workpiece using an optical sensor of a measuring apparatus, the method comprising:

capturing a plurality of images of the surface of the workpiece using the optical sensor, wherein each image respectively images a region of the surface of the workpiece, wherein each image is assigned a defined 6-DOF pose of the optical sensor relative to the workpiece and a defined focal plane position of the optical sensor, and wherein the captured images form an image stack;

determining a sharpness value for each picture element of each image of the image stack in order to generate a sharpness map for each image of the image stack, wherein each sharpness map includes the determined sharpness value of each picture element of the respective image, and wherein the sharpness maps of the images form a sharpness map stack;

transforming the sharpness maps of the sharpness map stack into a defined reference system based on the respective assigned 6-DOF pose and focal plane position of the optical sensor in order to generate a sharpness cloud, wherein the sharpness cloud includes the determined sharpness value of each picture element of each image of the plurality of images, wherein the sharpness cloud forms a three-dimensional scalar field that assigns each determined sharpness value to a respective point in a space of the defined reference system; and generating a surface profile of the workpiece by determining one or more areas of maximum sharpness of the sharpness cloud, wherein the areas of maximum sharpness represent the surface of the workpiece, wherein the areas of maximum sharpness in the sharpness cloud are determined by a neural network, wherein the neural network is trained to determine or identify the areas of maximum sharpness in the sharpness cloud.

\* \* \* \* \*